United States Patent [19]

Wawrzyniak

[11] 4,111,442
[45] Sep. 5, 1978

[54] FLOATING TOOL HOLDER

[76] Inventor: Walter W. Wawrzyniak, 39230 Gary, Mt. Clemens, Mich. 48043

[21] Appl. No.: 706,933

[22] Filed: Jul. 19, 1976

[51] Int. Cl.² .................. B23B 31/16; B23B 5/22; B23B 5/34
[52] U.S. Cl. ................... 279/16; 10/141 H; 408/238
[58] Field of Search .............. 10/89 F, 141 H; 408/127, 48, 714, 238, 239; 279/16, 17, 18

[56] References Cited
U.S. PATENT DOCUMENTS

| | | | |
|---|---|---|---|
| 2,767,564 | 10/1956 | Green | 10/89 F |
| 3,421,770 | 1/1969 | Benjamin et al. | 279/16 |
| 3,521,314 | 7/1970 | Steiner | 10/141 H |
| 3,553,753 | 12/1971 | Hundley | 10/141 H |
| 3,740,063 | 6/1973 | Smith | 279/16 |
| 3,764,152 | 10/1973 | Eaves et al. | 279/16 |
| 3,895,881 | 7/1975 | Langlois | 408/239 X |
| 3,945,751 | 3/1976 | Johnson | 10/89 F |
| 4,014,622 | 3/1977 | Lotz | 10/89 F |

Primary Examiner—J. M. Meister
Attorney, Agent, or Firm—Whittemore, Hulbert & Belknap

[57] ABSTRACT

A floating tool holder including a cylindrical shank having a recess in one end thereof, floating structure including in different modifications an outer race or a torque washer and a tool receiver positioned within the recess and held in radially spaced relation to the recess walls by resilient O-rings whereby radial translation of the tool receiver with respect to the shank and pivotal movement of one end of the tool receiver within and relative to the shank are permitted, tool adapter structure received within the tool receiver, and means for releasably securing the tool adapter structure to the tool receiver.

In another modification, the floating tool holder includes telescopic, resiliently biased compression structure received over the shank thereof. The floating tool holder may be further modified by a quick-release coupling for securing a tool adapter to the tool receiver portion of the floating structure.

21 Claims, 18 Drawing Figures

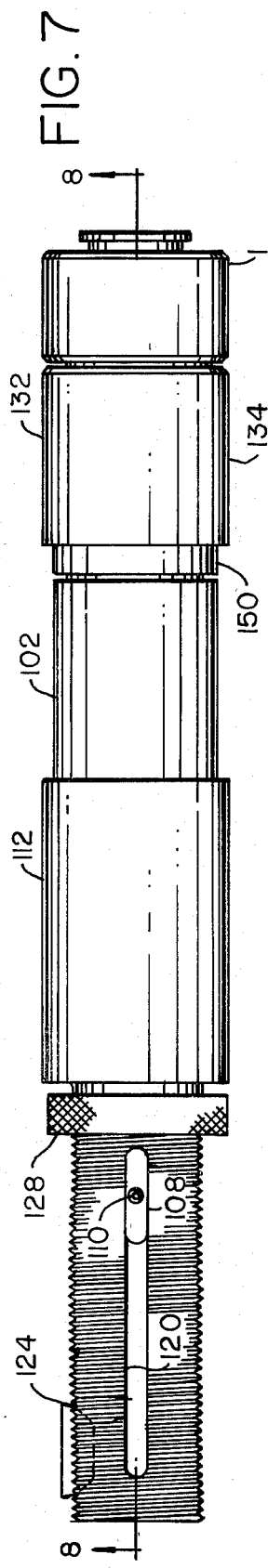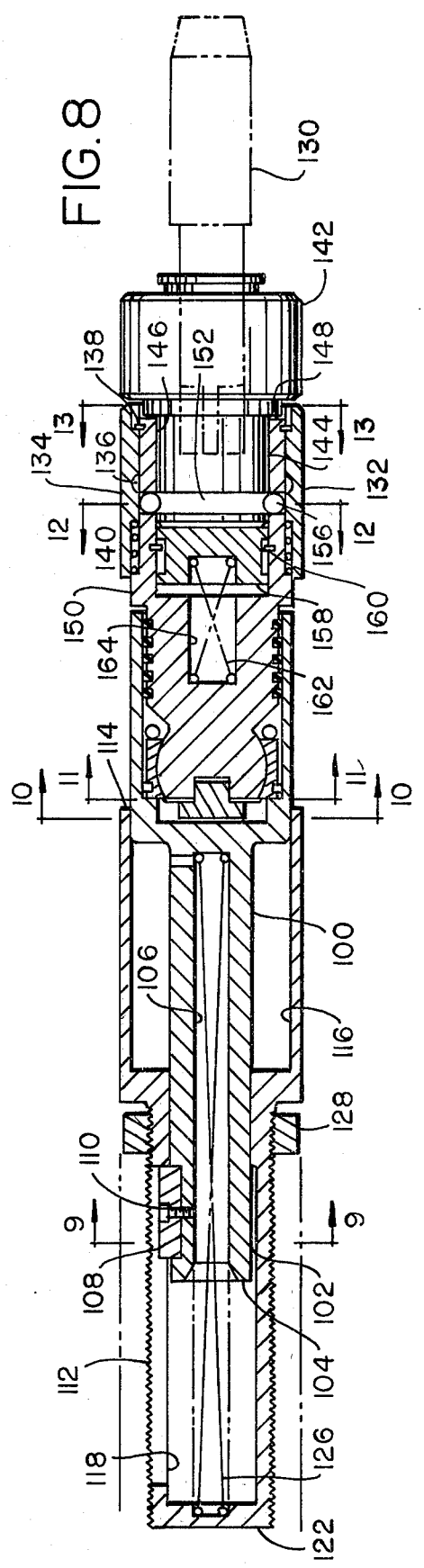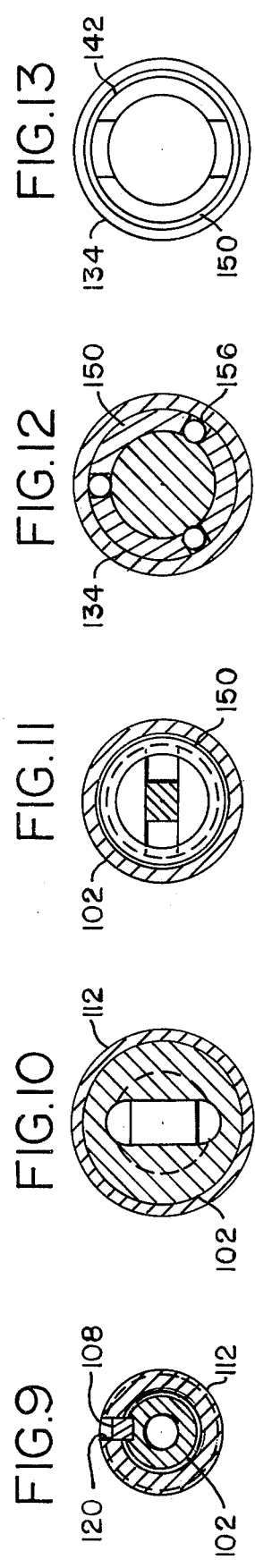

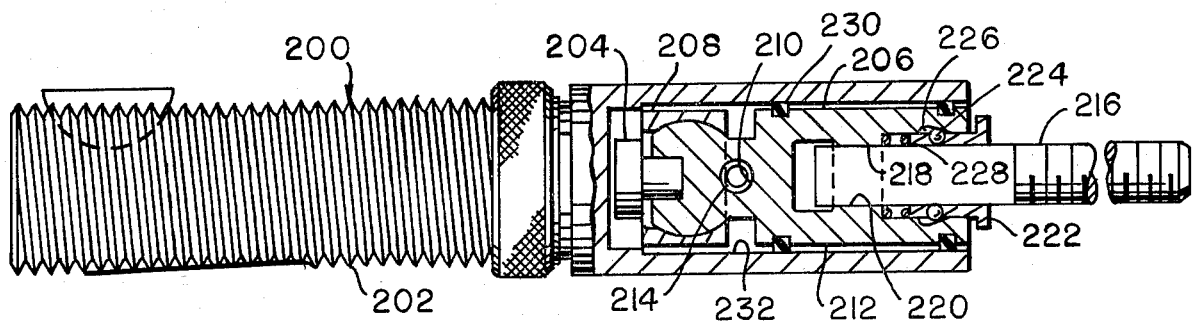
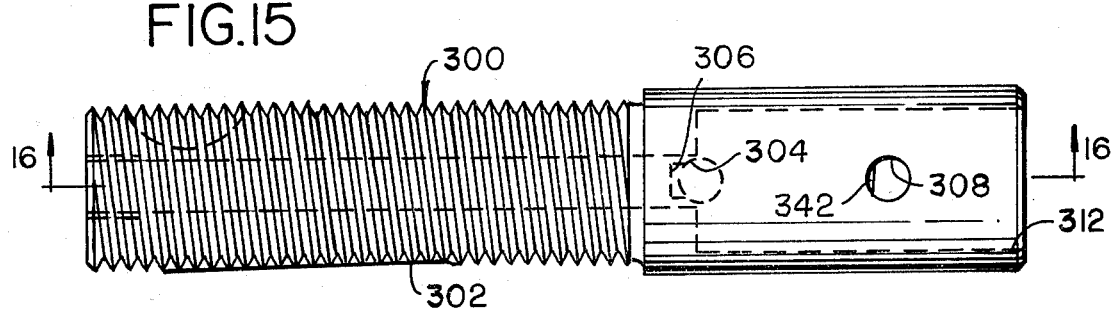
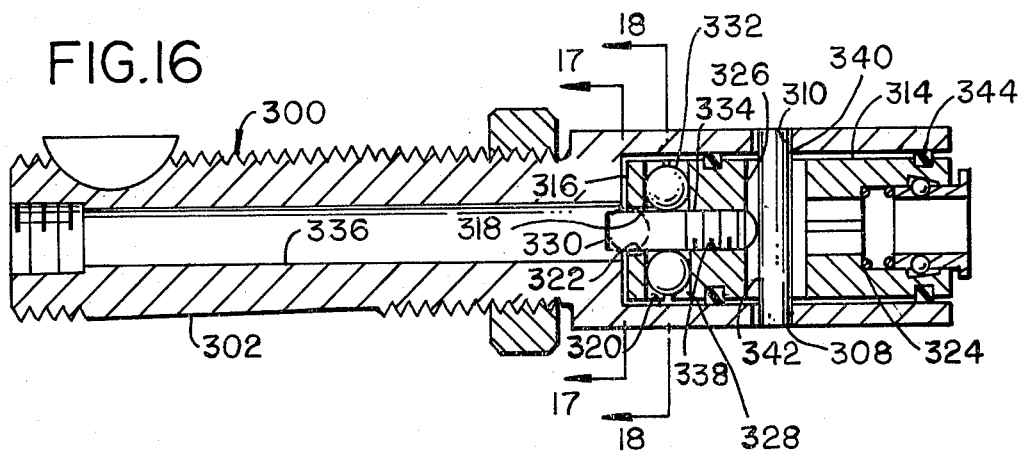
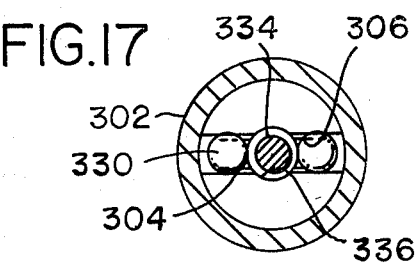
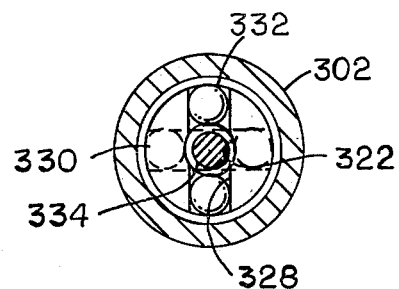

FLOATING TOOL HOLDER

BACKGROUND OF THE INVENTION

1. Field of the Invention

The invention relates to tool holders and refers more specifically to floating tool holders of a type wherein structure is provided to move a tool held thereby transversely with respect to the axis of the tool holder and/or pivot the tool with respect to the axis of the tool holder so that the axis of the tool is not parallel with the axis of the tool holder to permit minor alignment of the tool with openings to be machined which are not perfectly aligned with the axis of the tool holder.

The invention further relates to tool holders wherein compression means are provided in conjunction with the tool holder for permitting axial contraction of the tool holder in the event of greater misalignment of the tool with an opening to be machined, or in the event no opening to be machined has been provided, to prevent damage to the tool, tool holder, and/or workpiece. The invention further refers to such a tool holder wherein a quick-change coupling is provided to facilitate rapid installation of a tool on the tool holder and removal of the tool therefrom.

2. Description of the Prior Art

In the past, tool holders have generally been relatively rigid. That is to say, tool holders have been designed to secure a tool thereto on, for example, the axis of the tool holder. With such structure, as the tool holder is directed toward a workpiece, the axis of the tool holder must be aligned with openings in the workpiece to be machined by means of a tap tool or the like, for example, since slight misalignment of the hole, either due to translation of the axis of the hole with respect to the axis of the tool, or an angular displacement of the axis of the hole with respect to the axis of the tool may result in broken taps, damaged tool holders and/or workpieces.

Devices have sometimes been provided for permitting a slight translation of the tool within the tool holder to align the tool with the axis of the opening. In some very few instances, structure permitting both translation and pivoting of the axis of the tool to align the tool in misaligned openings has been provided. Such structure as has been provided in the past has, however, not included both possible movements or has been particularly complicated and therefore expensive and not generally efficient.

Such prior structure has further required the tool holder to have a considerably axial length which is undesirable in many machining operations wherein space for the tool holder is limited. In addition, such structures of the past have not always provided axial compression so that if a hole is totally misaligned with the tool in the tool holder, or if the hole is missing, the tool holder will contract on engagement of the tool with the workpiece.

Also in the past, tool holder structures have not always been provided with simple, efficient and economical quick-release couplings for mounting tools thereon. Thus, tool changing has been more difficult than necessary and has been time consuming and therefore expensive.

SUMMARY OF THE INVENTION

In accordance with the invention there is provided a floating tool holder including a shank having means for securing the shank to a spindle for rotation therewith on one end thereof and having a recess in the other end thereof. The floating tool holder further includes floating structure positioned within the recess in the shank, which in one modification includes an outer race held within the recess for translation with respect to the axis of the shank and a tool receiver including a ball on one end received in the outer race for pivotal movement therein and having a recess in the other end thereof for receiving a tool adapter. Both the outer race and tool receiver of the floating structure of the floating tool holder are resiliently centered within the recess in the shank by means of O-rings extending around the periphery thereof between the outer race and tool receiver and the inner wall of the recess in the shank of the tool holder. A tool adapter is secured within the recess in the tool receiver by means of a collet and structure is provided between the tool holder shank, tool receiver and tool adapter for positively rotating each from the other in turn on rotating of the shank.

In one modification of the floating tool holder structure, compression means are provided for permitting telescoping of the shank portion of the tool holder in case of a greater misalignment between a tool secured to the tool holder and a hole than it is possible to compensate for in the tool holder or for compensating for a hole which has been left out of a workpiece. In addition, a quick-release coupling may be provided for securing the tool adapter to the tool receiver and releasing it. Release of the tool adapter may be aided by resilient means urging the tool adapter out of engagement with the tool receiver.

In another modification of the floating tool holder structure, the outer race is replaced by a torque washer having perpendicular slots therein cooperating with similar slots in the shank and tool receiver and bearings within the slots to permit pivotal and radial movement of the tool receiver relative to the shank.

BRIEF DESCRIPTION OF THE DRAWINGS

FIG. 7 is a top view of a modified floating tool holder constructed in accordance with the invention including compression structure and a quick-release coupling in conjunction therewith.

FIG. 8 is a longitudinal section view of the modified tool holder illustrated in FIG. 7, taken substantially on the line 8—8 in FIG. 7.

FIGS. 9–13 are section views of the modified floating tool holders illustrated in FIGS. 7 and 8, taken substantially on the lines 9—9, 10—10, 11—11, 12—12 and 13—13, respectively, in FIG. 8.

FIG. 14 is a longitudinal cross section of another modification of the floating tool holder of the invention.

FIG. 15 is a side elevation view of yet another modification of the floating tool holder of the invention.

FIG. 16 is a longitudinal section view of the modification of the floating tool holder of FIG. 15.

FIGS. 17 and 18 are section views of the modified floating tool holder of FIGS. 15 and 16, taken substantially on the lines 17—17 and 18—18, respectively.

DESCRIPTION OF THE PREFERRED EMBODIMENTS

Figure 1:
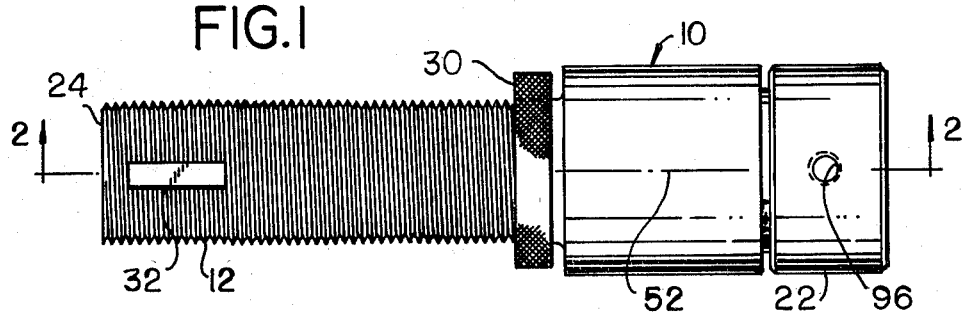
FIG. 1 is a top view of a floating tool holder constructed in accordance with the invention.
Figure 2:
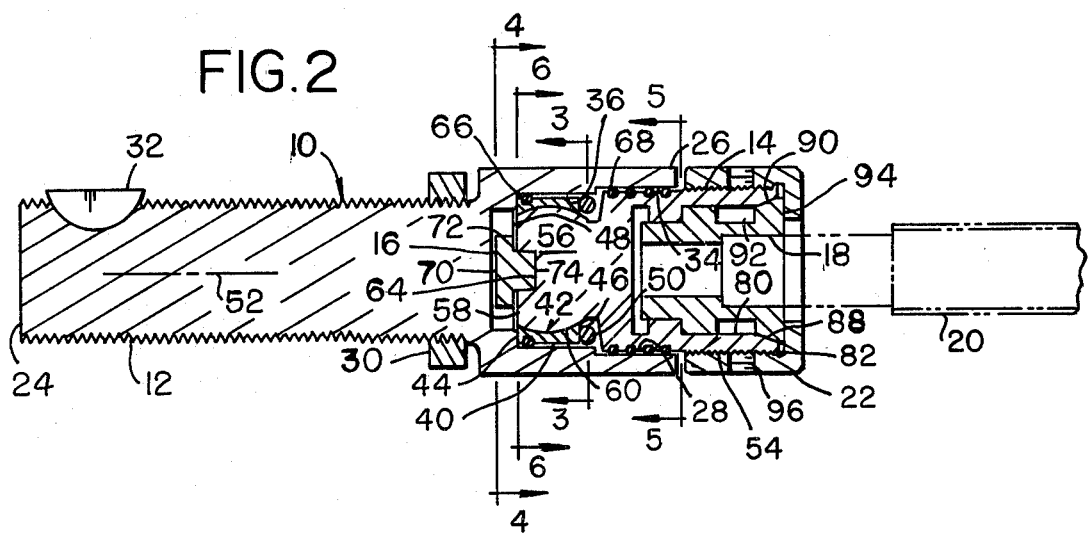
FIG. 2 is a longitudinal section view of the tool holder of FIG. 1, taken substantially on the line 2—2 in FIG. 1.
Figure 3:
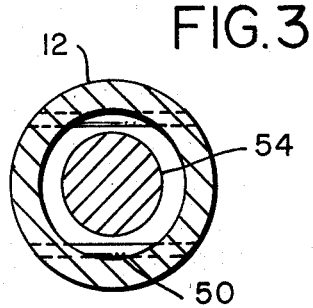
FIGS. 3–6 are section views of the floating tool holder illustrated in FIGS. 1 and 2, taken substantially on the lines 3—3, 4—4, 5—5 and 6—6, respectively, in FIG. 2.

The floating tool holder 10, as shown best in FIG. 2, includes a shank 12, floating structure 14, drive means 16 for rotating the tool receiver 54 of the floating structure 14 with the shank 12, a tool adapter 18 received within the floating structure 14 for rotation therewith and receiving a tool 20, and a collet 22 for securing the tool adapter 18 to the floating structure 14 and for securing the tool 20 to the tool adapter 18.

The shank 12, as shown, includes a threaded end 24 and an end 26 having a recess 28 therein receiving the floating structure 14. A locating nut 30 is received on end 24 of the shank 12 for axially positioning the shank 12 in a spindle or the like, not shown. Key structure 32 is also provided in conjunction with the shank 12 and is operable in conjunction with the spindle means receiving the end 24 of the shank 12 for positively driving the shank 12 in rotation with the spindle means.

Figure 4:
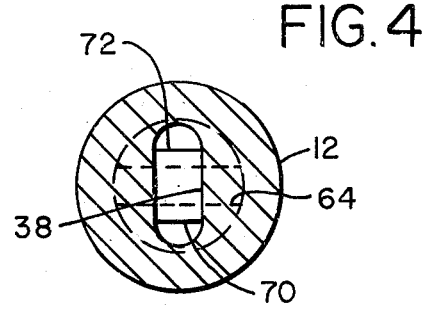

The recess 28 in the end 26 of the shank 12 has increasingly smaller diameter portions 34 and 36 inwardly thereof. A slot 38 extends across the bottom of recess 28, as shown best in FIGS. 2 and 4.

The floating structure 14 includes the outer race 40 having a spherical segment inner surface 42 and ends 44 and 46. The outer race 40, as shown, has a diameter slightly smaller than the inner diameter of portion 36 of the recess 28.

In assembly, the outer race 40 is positioned with the end 44 thereof in contact with the bottom 48 of the recess 28. The other end 46 of the outer race 40 is held in contact with the bottom 48 of recess 28 by means of pins 50 extending through the shank 12 and across the recess 28 at the locations indicated in contact with end 46 of outer race 40. Thus, the outer race 40 is secured within the end 26 for limited movement transversely of the axis 52 of the tool holder 10.

The floating structure 14 further includes the tool receiver 54. Tool receiver 54 has the ball portion 56 on end 58 thereof having the outer spherical surface 60. The ball portion 56 on end 58 of the tool receiver 54 is received within the outer race 40 with the spherical surfaces 42 and 60 permitting pivotal movement of the tool receiver about the center 62 of the spherical surfaces. A slot 64 is provided extending across the end 58 of the tool receiver 54.

Both the outer race 40 and the tool receiver 54 of the floating structure 14 are resiliently centered on the axis 52 by means of a plurality of resilient O-rings 66 and 68 positioned in grooves in the outer surfaces thereof and extending between the outer surface of the race 40 and receiver 54 into engagement with the inner surface of the recess 28 in the end 26 of the shank 12, as shown. The O-rings permit radial translation of both the tool receiver 54 and outer race 40 with respect to the axis 52 of the tool holder and further permit angular movement of the axis of the tool receiver about the center of curvature 62 of the spherical surfaces 42 and 60. Thus, both translation and angular displacement of a tool secured to the tool receiver is permitted.

A T-shaped drive member 70 is provided to insure positive driving of the tool receiver 54 with the shank 12. One portion 72 of the drive member 70 is positioned within the slot 38 in the bottom of the recess 28 in the shank 12, while the other portion 74 of the drive member 70 is positioned in the slot 64 in the end 58 of the tool receiver.

Figure 5:
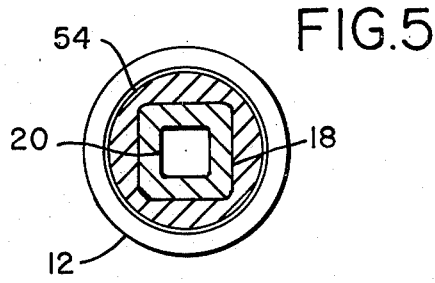
Figure 6:
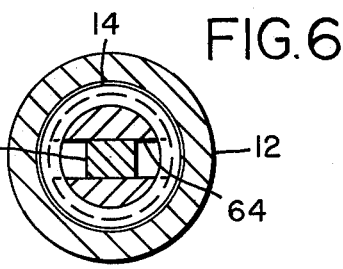

Tool adapter 18 is provided with a square end portion 76 which extends through a square portion 78 adjacent the bottom of the recess 80 in the end 82 of the tool receiver 54, as shown best in FIG. 5. Thus, the tool adapter 18 is caused to rotate with the tool receiver 54 and the tool 20 having a square end 84 on the shank 86 thereof is caused to rotate with the tool adapter.

The end 82 of the tool receiver 54 is further provided with a beveled annular inner edge 88 which engages the beveled surface 90 on the tool adapter 18 and the tool adapter 18 is provided with a groove 92 extending therearound and axially extending slots therein, if necessary, whereby the end 82 of the tool adapter 18 is made radially flexible to grip the shank 86 of the tool 20.

The collet 22 as shown is annular and is provided with internal threads whereby it may be threaded on the end 82 of the tool receiver and in engagement with the end 94 of the tool adapter causes the end 94 of the tool adapter to flex radially inwardly due to the engagement of the inclined surfaces 88 and 90 to lock the tool 20 in position. Radially extending openings 96 are provided in the collet 22 for set screws or the like to releasably secure the collet 22 to the tool receiver 54.

Thus, in overall operation of the floating tool holder 10, the shank 12 is mounted in a spindle in a predetermined axial position by the lock nut 30. Shank 12 is caused to rotate with the spindle by the key 32.

On advance of the tool holder 10 toward an opening in a workpiece, not shown, with which a tool in the tool holder is misaligned, either radially of the tool holder or angularly with respect to the axis of the tool holder, the floating structure including the outer race 40 and the tool receiver 54 are caused to move transversely of the shank within the recess 28 and/or angularly with respect to the axis of the shank to align the tool 20 with the hole.

Subsequently on rotation of the shank 12, the tool receiver 54 is rotated through the drive member 16. In turn, the tool adapter is rotated through the tool receiver and the tool is rotated through the tool adapter.

In the modified floating tool holder structure 100 illustrated in FIGS. 7-13, the shank 102 has a reduced diameter portion 104 including a cylindrical opening 106 therein. A key 108 is secured to the shank 102 by convenient means such as the bolt 110 and a housing 112 having a recess in the end 114 thereof with an enlarged diameter portion 116 and a smaller diameter portion 118 is sleeved over the shank 102, as shown best in FIG. 8, with the key 108 positioned in slot 120 in the housing 112 for limited axial reciprocation therein.

The exterior of the end 122 of the housing 112 is threaded and a key 124 is provided in conjunction therewith for causing rotation of the housing 112 with a spindle in which it is mounted, not shown. The key 108 causes rotation of the shank 102 on rotation of the housing 112.

Resilient spring means 126 is positioned in the recess 106 in the shank 102 and acts between the shank 102 and the end 122 of the housing 112 to urge the shank of the floating tool holder 100 out of the housing 112.

The locating nut 128 is provided on the threaded exterior surface of the end 122 of the housing 112 and serves to locate the housing 112 in an axially fixed position on a spindle or the like.

Thus, in operation of the modified floating tool holder structure 100 illustrated in FIGS. 7-13, should the tool 130 be moved toward a workpiece in which a hole has been badly misplaced or has been forgotten, the tool 130 will engage the workpiece, after which the shank 102 will move into the housing 112 in opposition to the biasing force of the spring 126. Such compression of the floating tool 100 will prevent damage to the tool 130, the tool holder 100, and the workpiece, not shown, in such situations.

Further, in the modified tool holder 100 illustrated in FIGS. 7 and 8, there is provided a quick-release coupling 132. The coupling 132 includes an outer sleeve 134 having a groove in the inner surface 136 thereof which is arcuate in cross section. Sleeve 132 is normally biased into engagement with the stop ring 138 by spring means 140.

The quick-release coupling 132 further includes the tool adapter 142 which is constructed and arranged to rigidly secure tool 130 thereto for rotation therewith in a known manner which will not be considered here. The adapter 132 includes a reduced diameter end 144 which is received within recess 146 in the end 148 of the tool receiver 150 and has an annular groove 152 therearound with an arcuate cross section, as shown.

Radial openings 154 are provided extending through the end 148 of the tool receiver 150 and spherical bearings 156 are positioned therein, as shown. The bearings 156 are related to the dimension of the wall thickness of the end 148 of the tool receiver 150, so that the bearings must extend into one or the other of the grooves 136 and 152 in assembly.

Thus, in operation of the quick-release structure 132 with the tool adapter 142 mounted on the tool holder 100, the bearings 156 maintain the tool holder in an axially fixed position since they cannot move radially against the sleeve 134 urged against the stop 138 by the spring means 140. When it is desired to release the tool adapter 142 for axial displacement, the sleeve 134 is moved to the left in FIG. 8 so that the groove 136 aligns with the openings 154, whereby the bearings 156 are urged radially outwardly into the groove 136, releasing the tool adapter 142. The tool adapter 142 is urged axially outwardly of the tool holder 100 by the member 158 which is reciprocal around the annular stop 160 under the bias of spring 162 positioned within the recess 164 in the tool receiver 150.

In the modified floating tool holder structure 200 illustrated best in FIG. 14, the shank 202 and drive means 204 are entirely the same as shank 12 and drive means 16 of the floating tool holder 10. The floating structure 206 is similar to the floating structure 14 of the tool holder 10 in that the outer race 208 is the same as the outer race 40. However, in the modified structure 200, an opening 210 is provided extending transversely through the tool receiver 212 and a single pin 214 having a diameter substantially smaller than the diameter of the opening 210 extends transversely through the opening 210 and is secured to the shank 202 at the ends thereof. The pin 214 again secures the outer race 208 and thus the entire floating structure 206 in predetermined axial position within the modified tool holder 200.

In addition, it will be noted that the tool 216 of the modified structure 200 is received directly in the tool receiver 212. In this regard, the tool 216 has a non-circular end 218 which engages the non-circular cross section of the recess 220 in the tool receiver 212. The tool 216 is maintained in assembly with the tool receiver 212 by means of the cylindrical collet 222 having the bearings 224 spaced radially therearound which may be received in the recess 226 in the tool receiver 212 when the collet 222 is moved to the left in FIG. 14 in opposition to the spring bias means 228.

In operation, the O-rings 230 again center the tool receiver 212 in the recess in the shank 202 and permit relative pivoting thereof about the inner race 208 and translation relative to the axis of the floating tool holder structure 200 as before.

In the modified floating tool holder structure 300 illustrated in FIGS. 15-18, the floating tool holder shank 302 is again similar to the shank 12. However, the shank 302 includes the circular segment cross section portions 304 on the slot 306 in the bottom thereof, as shown best in FIG. 15. In addition, transverse openings 308 and 310 are provided extending transversely through the shank 302 across the recess 312 therein.

The floating structure 314 in the modified floating tool holder 300 includes a torque washer 316 including a slot 318 in one side thereof having a circular segment cross section portion similar to that of the slot 306, which slot extends parallel to the slot 306. Washer 316 further includes the slot 320 in the other side thereof extending substantially perpendicularly to the slot 318 and including a similar circular segment cross section. An axial opening 322 is provided centrally through the torque washer 316.

The tool receiver 324 of the floating structure 314 of the modified tool holder 300 is again adapted at its outer end to receive a tool connected directly thereto in the manner considered in more detail in consideration of the modified floating tool holder 200. In addition, the tool receiver 324 includes a transverse opening 326 extending transversely therethrough, which opening is similar to the opening 210 in the modified floating tool holder 200. A slot 328 is further provided in the inner end of the tool receiver 324 and as shown has a circular segment cross section similar to the slot 320 and extends parallel thereto. Bearings 330 and 332 are positioned in the slots 306 and 318 between the shank 302 and torque washer 316 and in the slots 320 and 328 between the torque washer 316 and tool receiver 324 to permit relative pivoting of the tool receiver 324 with respect to the shank 302.

A threaded pin 334 extends through the opening 322 in the torque washer 316 into the opening 336 in the shank 302. The pin 334 is in threaded engagement with the inner end of the tool receiver 324 through the threaded opening 338 therethrough and makes contact with the pin 340 extending through the opening 326 through the tool receiver 324. The pin 340 has a flat, longitudinally extending side 342, as shown best in FIG. 15, and is sealed in the openings 310 and 308 in the shank 302.

Since the diameter of the pin 340 is substantially less than the diameter of the opening 326 through the tool receiver 324, the axial position of the tool receiver 324 may be initially adjusted by adjusting the threaded engagement of the pin 334 in the opening 338. Thus, production tolerances are reduced to a minimum.

As before, the angular and transverse positions of the tool receiver 324 are effected on compression of the O-rings 344 which separate the tool receiver 324 from the shank 302. The O-rings 344 center the tool receiver 324 and seal the drive structure including the bearings 330 and 332 which may be packed in grease, along with the other drive structures in the floating tool holders 10, 100 and 200.

While one embodiment and modifications of the floating tool holder of the invention have been considered in detail, it will be understood that other embodiments and modifications of the invention are contemplated. Thus, for example, the adapter 18 may be eliminated from the tool holder 10 and the tool received directly in tool receiver 54; also the key 108 and slot 120 in the floating tool holder structure 100 may be replaced by internal splines in the housing 112 and external splines on the shank 102, if desired. It is the intention to include all such embodiments and modifications as are defined by the appended claims within the scope of the invention.

What I claim as my invention is:

1. A floating tool holder comprising a shank including means on one end for securing the shank to a spindle or the like in an axially fixed position for rotation with the spindle, a recess in the other end of the shank, floating structure positioned within the recess in the other end of the shank having dimensions so as to be in spaced relation with the inside walls of the recess including a torque washer in the bottom of the recess and a tool receiver in the outer end of the recess, means for rotating the tool receiver on rotation of the shank including a first transversely extending slot in the bottom of the recess in the shank, a second slot in one side of the torque washer extending parallel to the first slot, a third slot in the other side of the torque washer extending substantially perpendicularly to the second slot and a fourth slot in the inner end of the tool receiver extending parallel to the third slot, each of said slots having a circular segment cross section and circular bearings positioned within the slots between the shank and torque washer and between the torque washer and tool receiver, means for securing the torque washer and tool receiver in predetermined axial positions within the recess in the shank comprising transverse openings extending through the shank across the recess therein, an opening extending through and transversely of the tool receiver and a first pin having a diameter less than the diameter of the opening through the tool receiver extending through the opening in the tool receiver and fixed at its ends in the openings in the shank, an opening extending through the shank axially thereof, an opening extending through the torque washer centrally thereof and an axial opening extending into the inner end of the tool receiver in communication with the transverse opening therethrough, and a second pin threadedly engaged with the tool receiver in the axial opening in the inner end thereof into engagement with the first pin and extending through the opening in the washer and into the axial opening in the shank, resilient O-ring structure positioned partially within the periphery of the tool receiver and extending between the tool receiver and the inner diameter of the recess for centering the floating structure and permitting relative translation and pivotal movement between the floating structure and tool holder shank and means for positively rotating the shank of the tool holder.

2. Structure as set forth in claim 1 and further including resilient means for urging the means for securing the tool to the floating structure away from the other end of the shank.

3. Structure as set forth in claim 1 and further including means for axially compressing the shank of the floating tool holder.

4. Structure as set forth in claim 3 wherein the means for axially compressing the shank of the floating tool holder comprises a housing positioned over the shank of the floating tool holder, key and slot means operable between the shank and housing for permitting limited relative axial reciprocation therebetween, and resilient means operable between the one end of the shank and the housing urging the floating tool holder out of the housing.

5. Structure as set forth in claim 1 wherein the means for securing the tool to the floating structure comprises a quick-change coupling.

6. A floating tool holder comprising a shank adapted to be secured in a spindle or the like at one end and having a recess in the other end, floating structure positioned within the recess in the other end of the floating tool holder shank, including a torque washer in the inner end of the recess in the floating tool holder shank having a diameter smaller than the diameter of the recess, a tool receiver received in the outer end of the recess in the tool holder shank and having a diameter smaller than the diameter of the recess, means for transferring torque between the tool holder shank through the torque washer to the tool receiver and means for securing the torque washer and tool receiver in predetermined axial position within the recess in the tool holder shank, including an opening extending transversely through the tool holder shank across the recess, an opening extending transversely through the tool receiver, a pin having a longitudinally extending flat side extending through the opening in the shank and tool receiver secured in the openings in the shank and having a diameter substantially less than the diameter of the opening through the tool receiver, an opening extending axially of the tool holder shank, an opening extending centrally through the torque washer and an opening extending axially through the inner end of the tool receiver and a threaded pin extending axially of the floating tool holder threadedly engaged in the opening in the inner end of the tool receiver and engaging the pin extending transversely of the tool holder shank, said pin extending freely through the opening through the washer and into the axial opening in the tool holder shank, which pin is threadedly adjustable in the tool receiver to position the inner end of the tool receiver relative to the torque washer within the recess in the tool holder shank, means for permitting translation of the floating structure relative to the longitudinal axis of the shank and means for permitting pivoting of the floating structure about the axis of the shank operable between the shank and floating structure, and means for releasably securing a tool to the floating structure.

7. Structure as set forth in claim 6 and further including resilient means for urging the means for securing the tool to the floating structure away from the other end of the shank.

8. Structure as set forth in claim 6 and further including means for axially compressing the shank of the floating tool holder.

9. Structure as set forth in claim 8 wherein the means for axially compressing the shank of the floating tool holder comprises a housing positioned over the shank of the floating tool holder, key and slot means operable between the shank and housing for permitting limited relative axial reciprocation therebetween, and resilient means operable between the one end of the shank and the housing urging the floating tool holder out of the housing.

10. Structure as set forth in claim 6 wherein the means for securing the tool to the floating structure comprises a quick-change coupling.

11. A floating tool holder comprising a shank adapted to be secured in a spindle or the like at one end and having a recess in the other end, floating structure positioned within the recess in the other end of the floating tool holder shank, including a torq washer in the inner end of the recess in the floating tool holder shank having a diameter smaller than the diameter of the recess, a tool receiver received in the outer end of the recess in the tool holder shank and having a diameter smaller than the diameter of the recess, means for transferring torque between the tool holder shank through the torque washer to the tool receiver, including a first slot in the bottom of the recess in the tool holder shank, a second slot in one side of the torque washer extending parallel to the slot in the bottom of the recess in the tool holder shank, a third slot extending perpendicular to the second slot in the other side of the torque washer, and a fourth slot in the inner end of the tool receiver extending parallel to the third slot, all of which slots have a circular segment cross section, and bearings having a diameter substantially equal to the diameter of the circular segment cross section of the slots positioned in the slots between the tool holder shank and the torque washer and between the torque washer and tool receiver, and means for securing the torque washer and tool receiver in pretermined axial position in the recess in the tool holder shank, and means for permitting translation of the floating structure relative to the longitudinal axis of the shank and pivoting of the floating structure about the axis of the shank operable between the shank and floating structure, and means for releasably securing a tool to the floating structure.

12. Structure as set forth in claim 11 and further including resilient means for urging the means for securing the tool to the floating structure away from the other end of the shank.

13. Structure as set forth in claim 11 and further including means for axially compressing the shank of the floating tool holder.

14. Structure as set forth in claim 13 wherein the means for axially compressing the shank of the floating tool holder comprises a housing positioned over the shank of the floating tool holder, key and slot means operable between the shank and housing for permitting limited relative axial reciprocation therebetween, and resilient means operable between the one end of the shank and the housing urging the floating tool holder out of the housing.

15. Structure as set forth in claim 11 wherein the means for securing the tool to the floating structure comprises a quick-change coupling.

16. A floating tool holder comprising a shank adapted to be secured in a spindle or the like at one end and having a recess in the other end, floating structure positioned in the recess in the other end of the floating tool holder shank including, a torque washer in the other end of the recess in the floating tool holder shank having a diameter smaller than the diameter of the recess, a tool receiver received in the outer end of the recess in the tool holder shank and having a diameter smaller than the diameter of the recess, and means for transferring torque between the tool holder shank and tool receiver through the torque washer, means for securing the torque washer and tool receiver in predetermined axial position within the recess in the tool holder shank, means permitting translation of the floating structure relative to the longitudinal axis of the shank and permitting pivoting of the floating structure about the axis of the shank operable between the shank and floating structure, and means for releasably securing a tool to the floating structure.

17. Structure as set forth in claim 16 wherein the means permitting translation of the flating structure relative to the longitudinal axis of the shank and permitting pivoting of the floating structure about the axis of the shank is resilient.

18. Structure as set forth in claim 16 and further including resilient means for urging the means for securing the tool to the floating structure away from the other end of the shank.

19. Structure as set forth in claim 16 and further including means for axially compressing the shank of the floating tool holder.

20. Structure as set forth in claim 19 wherein the means for axially compressing the shank of the floating tool holder comprises a housing positioned over the shank of the floating tool holder, key and slot means operable between the shank and housing for permitting limited relative axial reciprocation therebetween, and resilient means operable between the one end of the shank and the housing urging the floating tool holder out of the housing.

21. Structure as set forth in claim 16 wherein the means for securing the tool to the floating structure comprises a quick-change coupling.

* * * * *